(12) United States Patent
Tasma et al.

(10) Patent No.: US 7,383,935 B2
(45) Date of Patent: Jun. 10, 2008

(54) MOTORIZED ROLLER TRANSVERSE DRIVE

(75) Inventors: Ryan D. Tasma, Middleville, MI (US);
David H. Cotter, Coopersville, MI (US); Ronald C. Ehlert, Wyoming, MI (US)

(73) Assignee: Dematic Corp., Grand Rapids, MI (US)

( * ) Notice: Subject to any disclaimer, the term of this patent is extended or adjusted under 35 U.S.C. 154(b) by 106 days.

(21) Appl. No.: 10/710,809

(22) Filed: Aug. 4, 2004

(65) Prior Publication Data

US 2005/0040016 A1   Feb. 24, 2005

Related U.S. Application Data

(60) Provisional application No. 60/492,497, filed on Aug. 5, 2003.

(51) Int. Cl.
*B65G 13/02* (2006.01)

(52) U.S. Cl. ............... 198/370.01; 198/370.08; 198/457.03; 198/463.3; 198/782; 198/788; 198/809; 193/35 SS

(58) Field of Classification Search ......... 198/370.1, 198/370.08, 457.03, 463.3, 782, 788, 809; 193/35 SS
See application file for complete search history.

(56) References Cited

U.S. PATENT DOCUMENTS

| | | | |
|---|---|---|---|
| 3,592,329 A | 7/1971 | Fleischauer | |
| 3,608,713 A | 9/1971 | Crosby et al. | |
| 3,961,700 A | 6/1976 | Fleischauer | |
| 4,019,623 A * | 4/1977 | Tassi et al. | 198/370.1 |
| 4,081,078 A | 3/1978 | Richardson et al. | |
| 4,372,442 A | 2/1983 | Fleischauer | |
| 4,746,003 A * | 5/1988 | Yu et al. | 198/367 |
| 4,913,277 A | 4/1990 | Zorgiebel et al. | |
| 4,962,841 A * | 10/1990 | Kloosterhouse | 198/370.09 |
| 5,005,693 A | 4/1991 | Fultz et al. | |

(Continued)

FOREIGN PATENT DOCUMENTS

GB    2219781 A    12/1989

(Continued)

OTHER PUBLICATIONS

International Search Report and Written Opinion of corresponding PCT Application No. PCT/US2004/025155.

*Primary Examiner*—Gene O. Crawford
*Assistant Examiner*—Leslie A Nicholson, III
(74) *Attorney, Agent, or Firm*—Van Dyke, Gardner, Linn & Burkhart LLP

(57) ABSTRACT

A roller conveyor includes a plurality of idler rollers positioned along and between opposite sidewalls and a transverse drive system operable to rotatably drive at least some of the idler rollers of the roller conveyer. The transverse drive system includes a motorized roller positioned generally transverse to the idler rollers and a plurality of drive members drivably connected between the motorized roller and respective ones of the idler rollers. Actuation of the motorized roller drives each of the drive members, which in turn independently rotatably drive the respective idler rollers. The transverse drive system may be selectively operable to accumulate articles on one or more zones of the roller conveyor. The roller conveyor may include a right angle transfer unit operable to transfer articles in a direction generally normal to the direction of conveyance of the idler rollers.

21 Claims, 10 Drawing Sheets

U.S. PATENT DOCUMENTS

| | | |
|---|---|---|
| 5,086,906 A | 2/1992 | Ludke |
| 5,150,781 A | 9/1992 | Deisenroth et al. |
| 5,971,133 A | 10/1999 | Wilkins |
| 6,360,869 B1 * | 3/2002 | Itoh et al. ............... 198/370.1 |
| 6,484,886 B1 | 11/2002 | Isaacs et al. |
| 6,763,927 B2 * | 7/2004 | Itoh et al. ............... 198/370.1 |
| 2002/0092734 A1 * | 7/2002 | Troupos et al. ............ 198/809 |
| 2002/0134646 A1 * | 9/2002 | Itoh ....................... 198/370.1 |
| 2002/0134647 A1 | 9/2002 | Pelka |
| 2003/0047423 A1 | 3/2003 | Youn |
| 2003/0168320 A1 * | 9/2003 | Itoh et al. .................. 198/809 |

FOREIGN PATENT DOCUMENTS

| | | |
|---|---|---|
| JP | 2000255755 | 9/2000 |
| JP | 2002326711 | 11/2002 |
| JP | 20022347927 | 12/2002 |

* cited by examiner

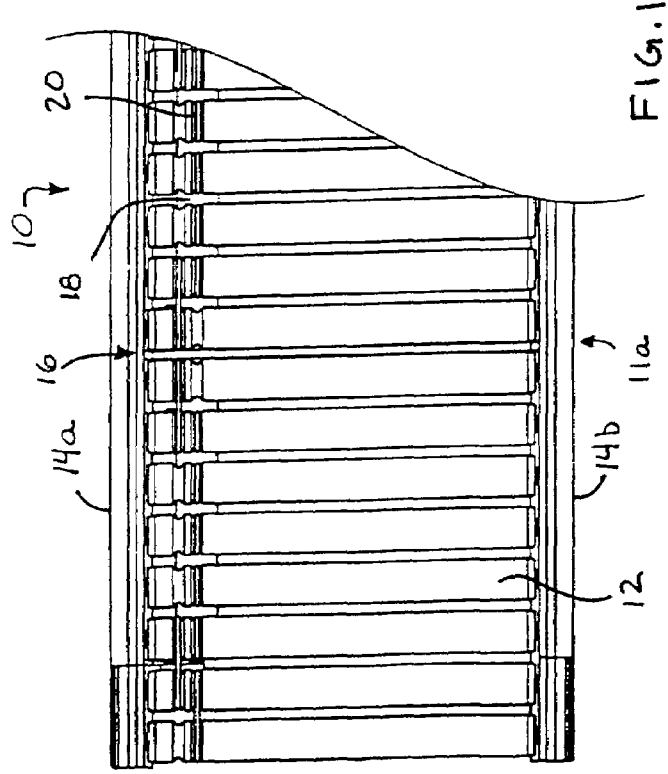
FIG. 1
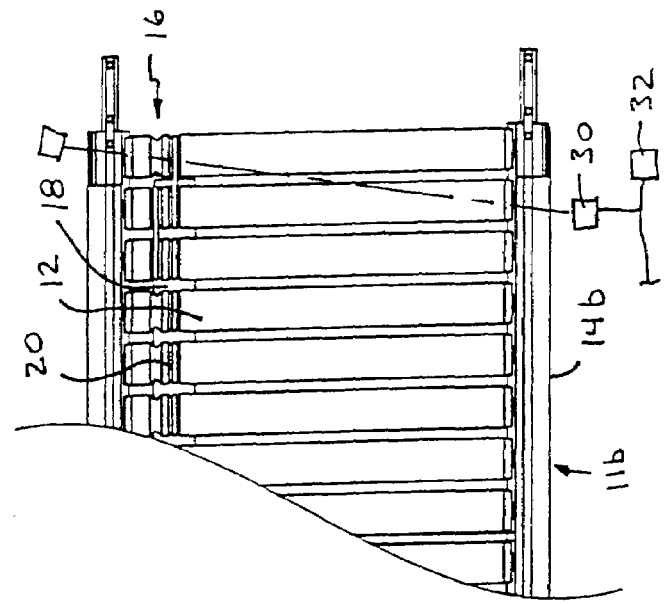
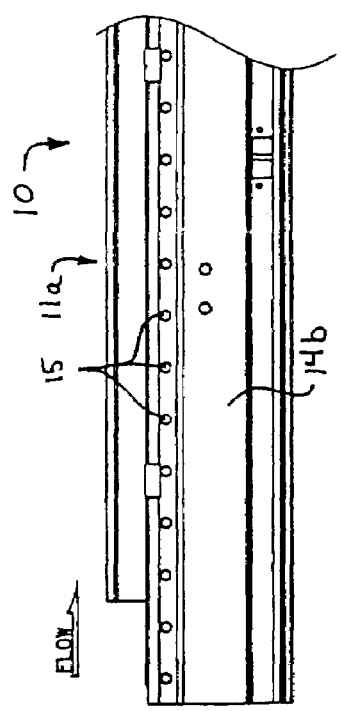
FIG. 2
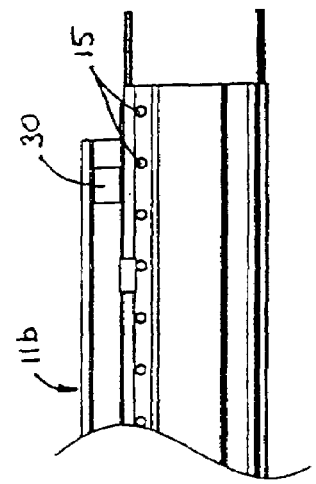

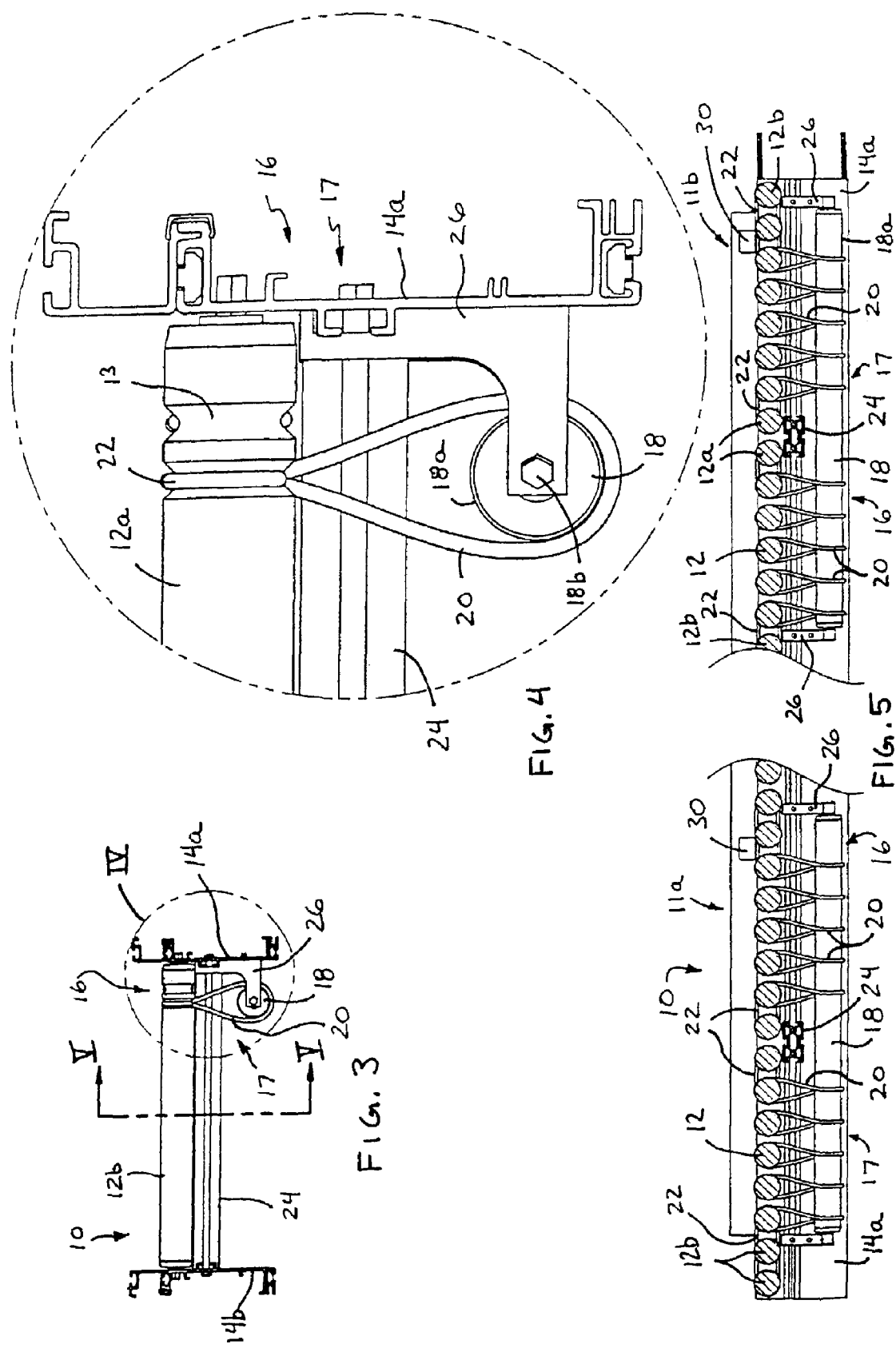

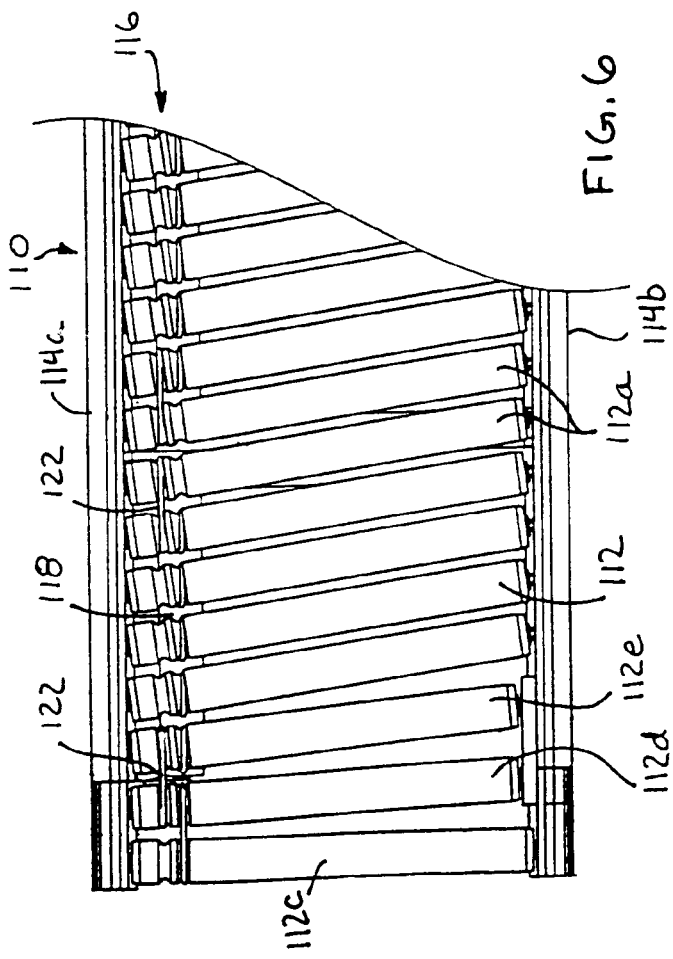
FIG. 6
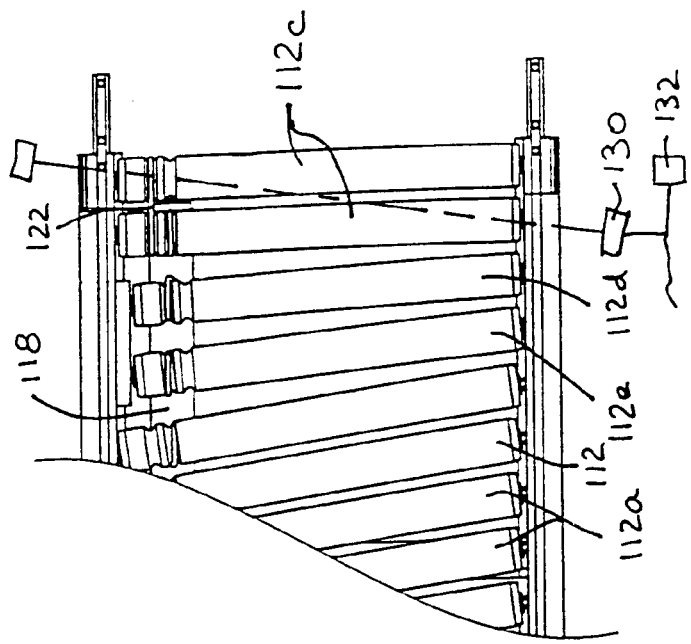
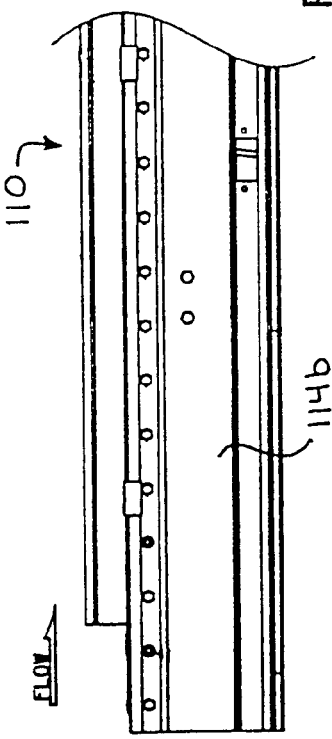
FIG. 7
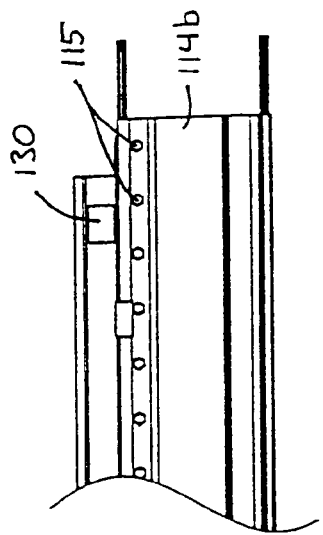

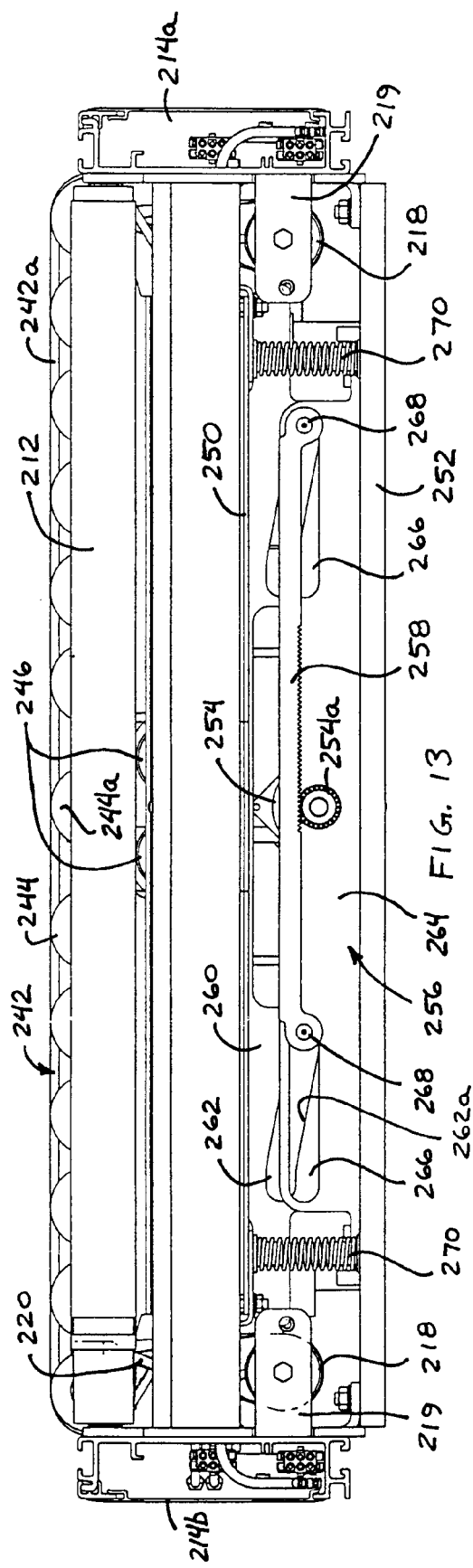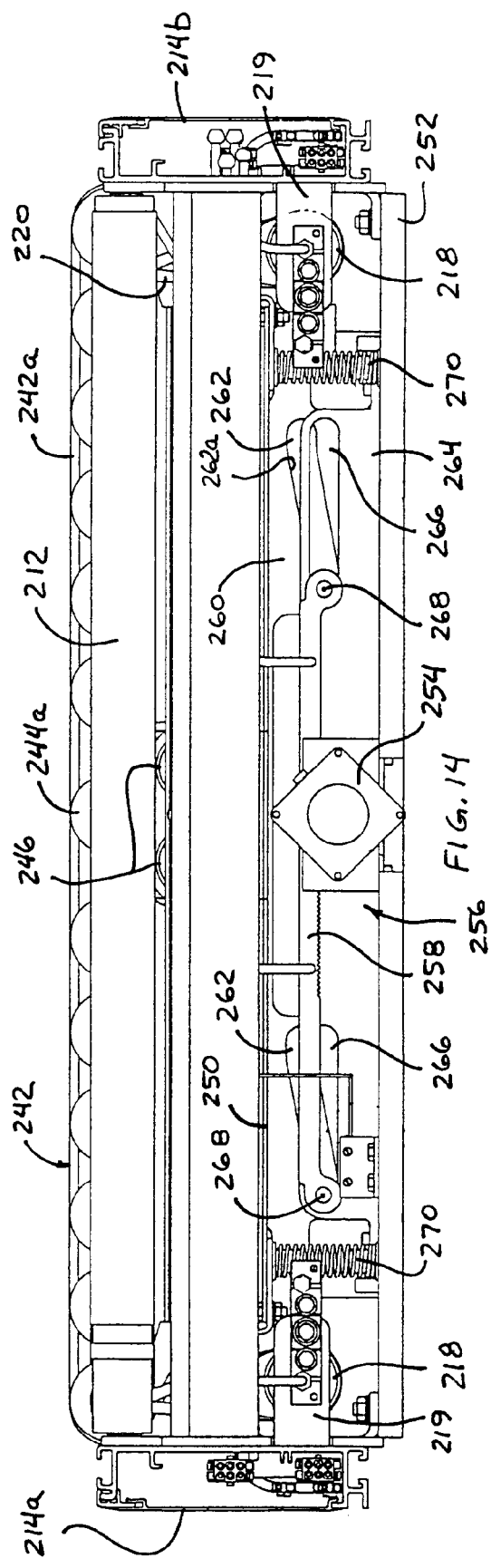

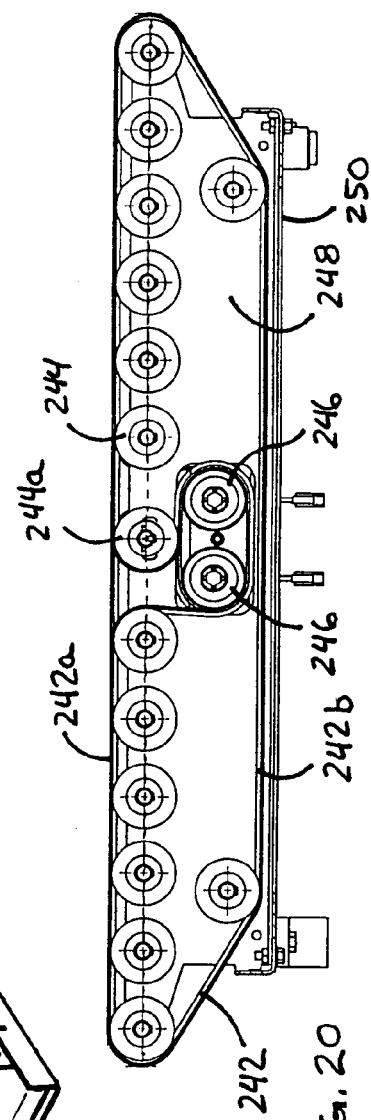
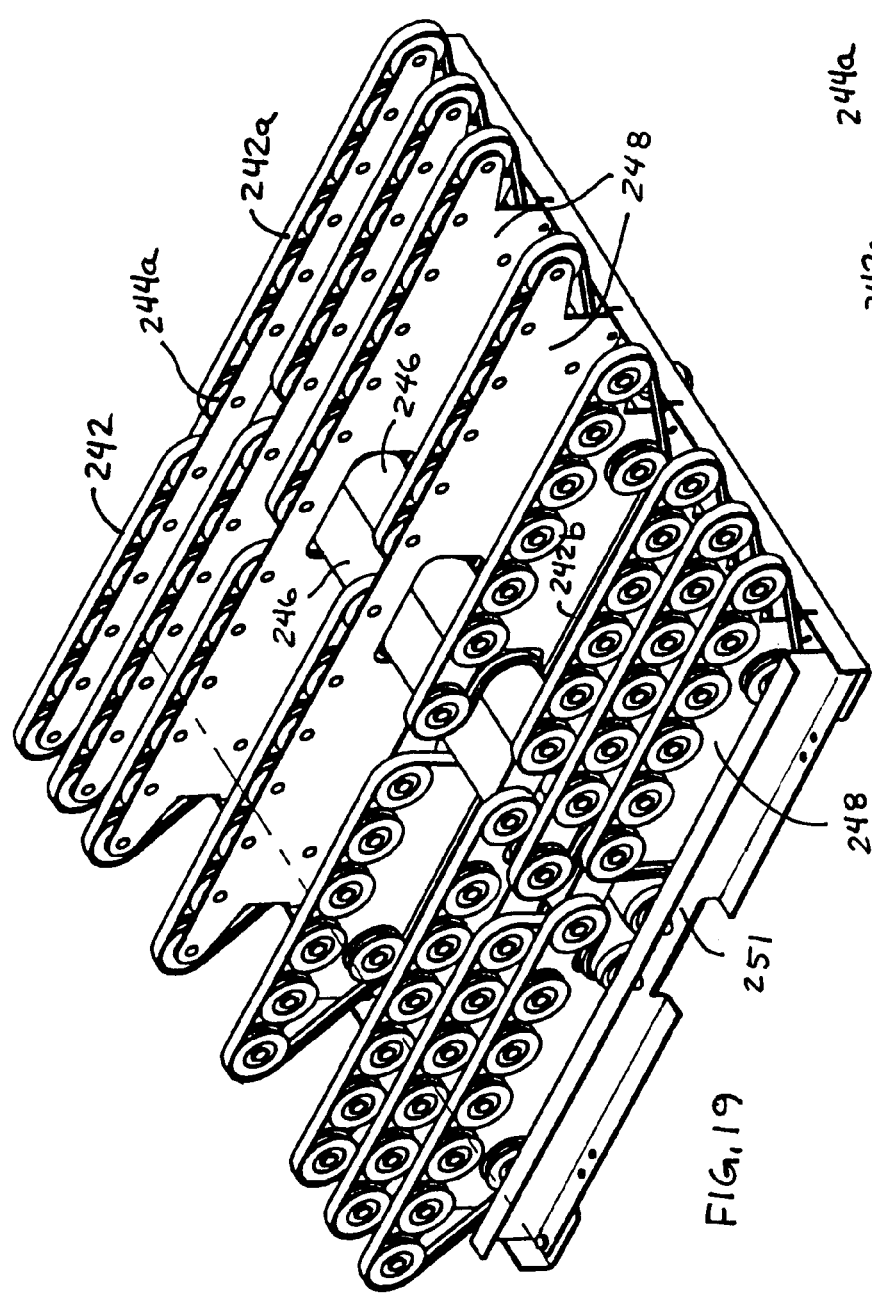

MOTORIZED ROLLER TRANSVERSE DRIVE

CROSS REFERENCE TO RELATED APPLICATIONS

The present application claims benefit of U.S. provisional application Ser. No. 60/492,497, filed Aug. 5, 2003, which is hereby incorporated herein by reference in its entirety.

FIELD OF INVENTION

The present invention relates generally to conveyors and, more particularly, to roller conveyors.

BACKGROUND OF INVENTION

Roller conveyors are known and typically include at least one powered or motorized roller and a plurality of idler or freely rotating or slave rollers. The idler rollers are driven via the powered roller and a plurality of O-rings or bands around adjacent rollers. For example, the powered or motorized roller may be positioned between two idler rollers and may be connected to and may drive the adjacent idler rollers via respective O-rings, while the adjacent idler rollers each may in turn be connected to and drive a second or adjacent idler roller via another O-ring, and so on along a zone or set of rollers of a roller conveyor.

Typically, as each O-ring is driven by one roller and drives the adjacent roller, a reduction in torque or power may occur at the interface of the O-ring on the rollers, such as a reduction of approximately 5% of the torque or power provided by the first roller. This reduction in power or torque may occur at each O-ring interface, such that additional power is typically lost at each idler roller toward the outer ends of the zone and away from the motorized roller. Accordingly, the two idler rollers adjacent to the motorized roller may have a torque or power reduction of approximately 5%, while the ends of a zone driven by a particular motorized roller may have substantially reduced power. Also, the end of the zone may be positioned adjacent to another end of an adjacent zone having substantially reduced power at the ends, such that several adjacent rollers may have reduced torque or power capabilities and, thus, may define potential stall areas along the conveyor. Also, because of the reduced power in certain areas of the roller conveyor, such conventional O-ring roller conveyors may have limited speed capability, and may be limited to conveying articles at approximately 150 feet per minute or thereabouts.

The reduction in torque or power at each interface of the O-rings and rollers may be increased if the rollers are skewed so as to convey articles or justify articles toward one side of the conveyor. In such applications, the rollers may have less torque or power capability away from the motorized roller and, thus, may be prone to have articles stall at the ends of the zones of the conveyor.

Therefore, there is a need in the art for a roller conveyor which overcomes the shortcomings of the prior art.

SUMMARY OF INVENTION

The present invention provides a transverse drive system for a roller conveyor. The transverse drive system includes a motorized roller which is transversely oriented with respect to a plurality of idler rollers of a roller conveyor. The motorized roller of the transverse drive system is operable to rotatably drive a plurality of idler or slave rollers of a zone or section of a roller conveyor via a plurality of drive members or belts or bands connected between the motorized roller and respective ones of the idler rollers. The motorized rollers of the zones thus may independently drive at least some of the idler rollers of the zone associated with the particular motorized roller.

According to an aspect of the present invention, a roller conveyor includes a pair of opposite sidewalls, a plurality of idler rollers positioned between the sidewalls, and a transverse drive system having at least one transverse drive unit comprising a self-driven or motorized roller positioned along the sidewalls and generally transverse to the idler rollers. The self-driven roller is connected to at least some of the idler rollers of the conveyor via a respective one of a plurality of drive members, wherein each of the drive members drivably connects the self-driven roller and the respective one of the idler rollers. Actuation of the self-driven roller drives the idler rollers via the respective drive members.

In one form, the idler rollers may be positioned generally normal to the sidewalls of the conveyor, such that articles are conveyed in a direction of conveyance along the side walls of the conveyor. The self-driven roller may be positioned beneath the idler rollers and generally orthogonal to the idler rollers. In another form, the idler rollers may be skewed with respect to the sidewalls of the conveyor to convey articles along the conveyor and toward one side or toward one of the sidewalls of the conveyor. The self-driven roller may be positioned beneath the skewed idler rollers and generally along or parallel to a sidewall of the conveyor.

Optionally, the roller conveyor may comprise multiple zones, with each zone of the roller conveyor including a respective transverse drive unit, which may be selectively operable to rotate or rotatably drive a plurality of idler rollers of the zone via a corresponding plurality of drive members connected between the idler rollers and the self-driven roller. The self-driven roller or rollers of the transverse drive units may be selectively actuatable and may rotatably drive the respective idler rollers in either direction. The self-driven rollers may be selectively operable in response to an article sensor positioned at at least some of the zones and may be selectively operable to accumulate articles on the zones of the roller conveyor.

The self-driven or motorized roller comprises an internal motor operable to rotatably drive a roller portion of the self-driven or motorized roller relative to an axle portion of the self-driven or motorized roller.

According to another aspect of the present invention, a transverse drive system is operable to rotatably drive a plurality of idler rollers of a conveyor. The idler rollers are mounted to opposite sidewalls of the conveyor. The transverse drive system comprises at least one transverse drive unit having a motorized roller and a plurality of drive members positionable around the motorized roller. The motorized roller is positionable generally transverse to the idler rollers of the conveyor. Each of the plurality of drive members is positionable around and in engagement with the motorized roller and a respective one of the idler rollers. The motorized roller is operable to independently rotatably drive the idler rollers via respective ones of the drive members.

According to another aspect of the present invention, a roller conveyor comprises opposite sidewalls, a plurality of idler rollers mounted to the opposite sidewalls, and a drive unit operable to independently rotatably drive at least three of the idler rollers. The drive unit comprises a motorized roller and at least three drive members. The motorized roller has an internal motor operable to rotate a roller portion of the motorized roller relative to a shaft portion of the motorized roller. Each of the at least three drive members is positioned around and in engagement with the roller portion of the motorized roller and a respective one of the at least three idler rollers. Rotation of the roller portion of the motorized roller independently rotatably drives each of the at least three idler rollers via the respective ones of the at least three drive members. The motorized roller may be positioned generally transverse to the idler rollers of the roller conveyor.

According to another aspect of the present invention, a right angle transfer unit positioned at a conveying section includes opposite sidewalls, a plurality of rollers mounted to and between the sidewalls, a base portion generally fixedly positioned relative to the sidewalls, a movable portion that is generally vertically movable relative to the base portion, a plurality of belts and a rotational drive motor. The rollers define a roller conveying surface for conveying articles in a first direction of conveyance. Each of the belts is reeved around a plurality of wheels. The belts and the wheels are mounted to the movable portion and are movably positioned between respective adjacent rollers. The belts define a belt conveying surface for conveying articles in a second direction of conveyance that is different from the first direction of conveyance, such as generally normal to the first direction of conveyance. The rotational drive motor is operable to rotate a rotatable drive member to cause vertical movement of the movable portion relative to the base portion to raise the belts relative to the rollers such that the belt conveying surface is positioned above the roller conveying surface. The belts are driven to convey articles in the second direction of conveyance when the belts are raised.

The rotatable drive member causes a translational movement of a lifting member which in turn causes generally vertical movement of the movable portion relative to the base portion. The lifting member includes at least one camming portion that moves along a slotted portion of the base portion and a slotted portion of the movable portion. The slotted portions are angled relative to one another such that movement along the slotted portions causes generally vertical movement of the movable portion relative to the base portion.

The belts may be driven via at least one motorized roller having an internal motor operable to rotate a roller portion of the motorized roller relative to an axle portion of the motorized roller. The axle portion of the motorized roller is mounted to the movable portion.

Therefore, the present invention provides a roller conveyor powered or driven by a transverse drive system having a motorized roller, whereby the motorized roller independently or separately drives at least some or most of the idler rollers of the zone associated with the motorized roller. The motorized roller is positioned generally transverse to the rollers and may rotatably and independently drive multiple idler rollers via respective drive members or bands. The motorized roller thus may independently drive more than only two idler rollers. The transverse drive system of the present invention thus may limit or avoid the loss of torque or power associated with the end rollers or portions of zones of conventional O-ring driven roller conveyors. The transverse drive system thus may not have the potential stall areas of conventional roller conveyors and may be operated at a higher speed than conventional roller conveyors. Also, the right angle transfer unit may be operable via a motorized roller and may be raised and lowered via a rotational drive motor. The right angle transfer unit thus may raise and lower the belts in an efficient and quiet manner, without pneumatic or hydraulic lift cylinders and the like.

These and other objects, advantages, purposes and features of the present invention will become apparent upon review of the following specification in conjunction with the drawings.

BRIEF DESCRIPTION OF DRAWINGS

FIG. 1 is a plan view of a zoned roller conveyor having a transverse drive system in accordance with the present invention;

FIG. 2 is a side elevation of the roller conveyor of FIG. 1;

FIG. 3 is an end elevation of the roller conveyor of FIGS. 1 and 2;

FIG. 4 is an enlarged end elevation of the area IV in FIG. 3;

FIG. 5 is a sectional view of the roller conveyor taken along the line V-V in FIG. 3;

FIG. 6 is a plan view of a roller conveyor having a plurality of skewed rollers and including a transverse drive system in accordance with the present invention;

FIG. 7 is a side elevation of the roller conveyor of FIG. 6;

FIG. 13 is an end elevation of the right angle transfer unit of FIGS. 11 and 12;

FIG. 14 is another end elevation of the right angle transfer unit at the opposite end from the end shown in FIG. 13;

FIG. 19 is an upper perspective view of the transfer belts of the right angle transfer unit of FIGS. 11-18; and FIG. 20 is an end elevation of the transfer belts of FIG. 19.

DETAILED DESCRIPTION

Figure 9:
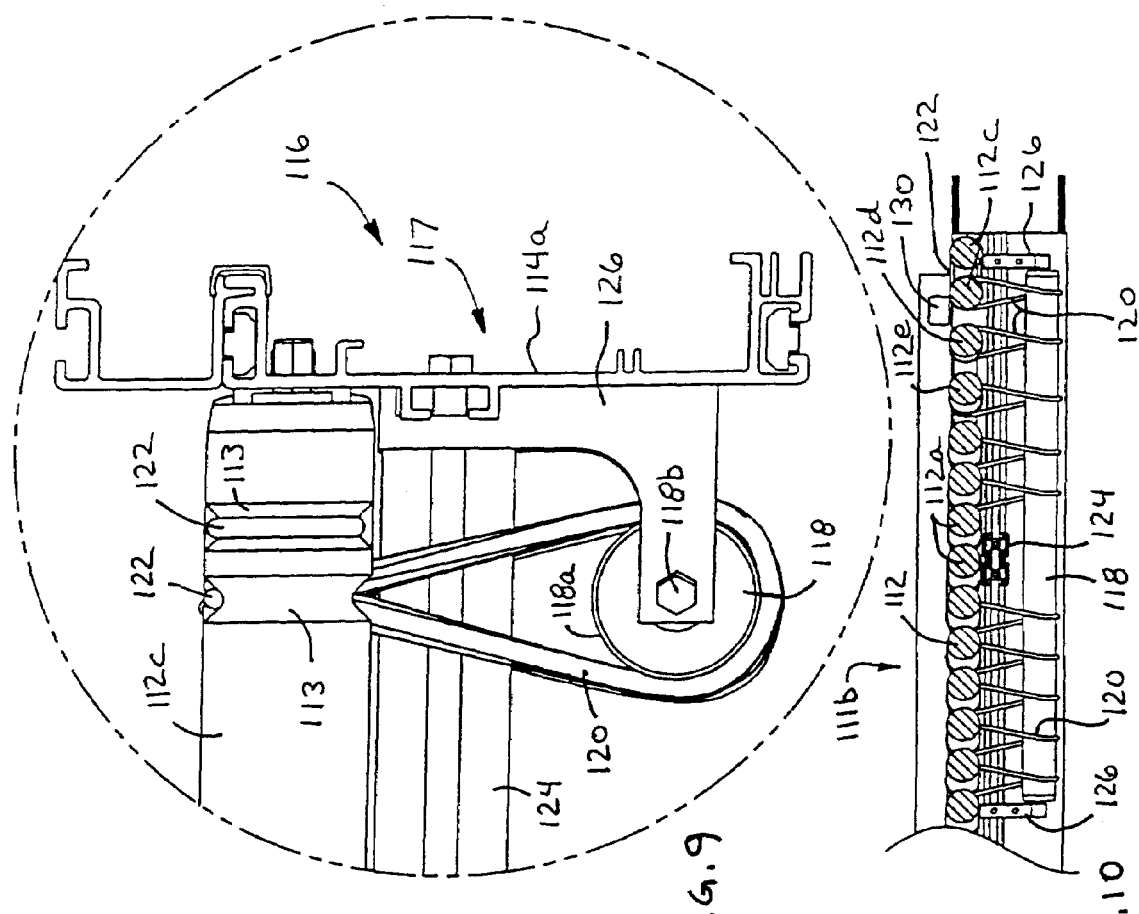
FIG. 9 is an enlarged end elevation of the area IX in FIG. 8.
Figure 8:
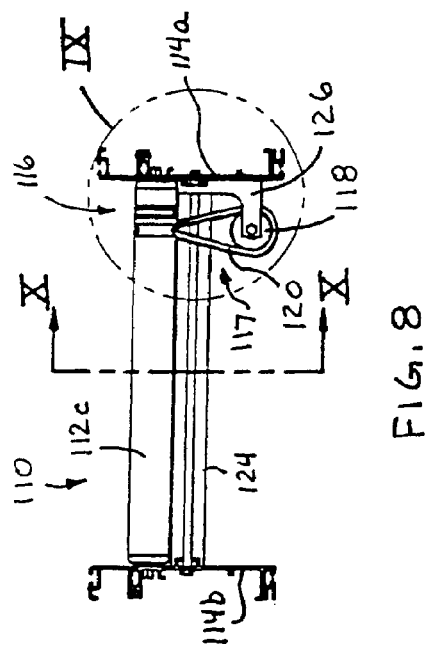
FIG. 8 is an end elevation of the roller conveyor of FIGS. 6 and 7.

Referring now to the drawings and the illustrative embodiments depicted therein, a roller conveyor 10 includes a plurality of idler rollers 12 mounted to and extending between a pair of opposite sidewalls 14*a*, 14*b*, and a transverse drive system 16 which is operable to drive the rollers 12 of conveyor 10 (FIGS. 1-5). The idler rollers 12 comprise a plurality of idler or freely rotating or slave rollers and define a conveying surface of roller conveyor 10. As shown in FIGS. 3-5, transverse drive system 16 includes a motorized roller 18 mounted to and/or positioned generally along one of the sidewalls 14*a*, and a plurality of connecting members or drive members or bands 20 that drivably connect motorized roller 18 to the corresponding or respective idler rollers 12. As best seen in FIG. 5, roller conveyor 10 may comprise a zoned conveyor arranged in two or more tandem zones 11a, 11b, and transverse drive system 16 may comprise two or more transverse drive units 17. Each transverse drive unit 17 may drive the idler rollers of a respective zone and may include a motorized roller 18 and a plurality of O-rings or drive members or bands 20 connected between the motorized roller 18 and respective ones of the idler rollers 12. Optionally, the transverse drive unit may be implemented with a right angle transfer unit or pop up transfer unit, such as shown in FIGS. 11-19 and discussed below.

As best seen with reference to FIGS. 3-5, each drive member 20 is wrapped around the motorized roller and a respective one of the idler rollers 12, such that the motorized roller 18 independently or separately rotatably drives at least some or most of the idler rollers 12 of the conveyor roller or of the respective zone of the conveyor roller associated with the motorized roller. Each drive unit 17 of the transverse drive system 16 thus may independently drive most of the rollers of the particular zone, and thus may limit or substantially reduce the loss of power or torque provided to the rollers along the particular zone or toward the ends of the zone.

As shown in FIG. 5, some of the idler rollers 12a of the roller conveyor 10 may be rotatably driven via a connecting or drive member or O-ring 22 or the like wrapped around or reeved around one of the rotatably driven idler rollers 12 (driven by the drive members 20 and motorized roller 18) and the idler roller 12a, in order to rotatably drive the rollers 12a, which may be positioned in areas where the motorized roller 18 and drive members 20 may not readily connect. For example, the rollers 12a positioned above a cross member 24 or the like extending across and between the sidewalls 14a, 14b of conveyor 10 may require an O-ring or band 22 or the like to rotatably drive the rollers, because the cross member 24 may limit or substantially block access to the rollers 12a from underneath, as can be seen in FIG. 5. Also, one or more idler rollers 12b at the ends of the roller conveyor or conveyor zone may be rotatably driven via O-rings 22 or the like, because these rollers 12b may be positioned beyond the end of the motorized roller 18 or may be generally inaccessible from beneath for the drive members 22 to engage or wrap therearound.

Motorized or powered or driven roller 18 may comprise a motorized or self-driven roller with an internal motor that is operable to rotate a roller portion 18a of the roller relative to a shaft portion or axle portion 18b or mounting portion of the motorized roller. The axle portion 18b of motorized roller 18 may be mounted at each end of the motorized roller to a mounting bracket or mounting member 26, which may mount to the sidewall 14a of roller conveyor 10, such that motorized roller 18 is positioned at and generally along sidewall 14a of the roller conveyor.

For example, motorized roller 18 may be of the type commercially available from various sources, such as a 12-volt DC or 24-volt DC motorized roller or the like. Optionally, the motorized roller may comprise a DC motorized roller, such as a 12-volt DC motorized roller or the like, such as a roller of the type disclosed in U.S. Pat. No. 6,244,427, the disclosure of which is hereby incorporated herein by reference. Optionally, the motorized roller may comprise a 24-volt DC motorized roller or a 42-volt DC motorized roller or a 48-volt DC motorized roller or the like. For example, the motorized roller may comprise a 48-volt DC motorized roller having a diameter of approximately 50 mm and an overall width of between 450 mm and 900 mm, or any other desired width to span the desired number of idler rollers. The 48-volt DC motorized roller may comprise a DC brushless motor and may be operable, for example, at speeds between approximately 130 rpm and 1,150 rpm, and may provide an output of approximately 3 Nm of torque at approximately 400 rpm and approximately 1.5 Nm of torque at approximately 1,150 rpm. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The motor of the motorized roller may drive the roller portion directly, such as disclosed in U.S. Pat. No. 6,244,427, or may drive the roller via a gear train or the like, such as disclosed in U.S. Pat. No. 5,442,248, the disclosures of which are hereby incorporated herein by reference.

Idler rollers 12, 12a, 12b of roller conveyor 10 may be conventional, freely rotating rollers, such as the types commercially available from various sources. The shafts of the idler rollers may be mounted within holes or apertures 15 in the sidewalls 14a, 14b to limit or substantially preclude rotation of the shafts when the roller portions of the idler rollers are rotated due to the driving of the drive members 20 via activation of motorized roller 18.

Motorized roller 18 may be positioned along sidewall 14a of conveyor 10 and generally beneath a groove or circumferential indentation 13 (FIG. 4) in each of the idler rollers 12, such that drive member 20 may rest within the groove 13 of the respective idler roller 12 to align or generally maintain drive member 20 in the proper position around idler roller 12 during operation of transverse drive system 16. Optionally, roller portion 18a of motorized roller 18 may include grooves or indentations circumferentially therearound for receiving or partially receiving drive members 20, in order to limit or substantially preclude longitudinal movement of the drive members along motorized roller 18 during operation of transverse drive system 16. The other idler rollers 12a, 12b of the roller conveyor 10 that are connected to idler rollers 12 via the O-rings 22 or the like may likewise include grooves or circumferential indentations 13 therearound for receiving the O-rings 22, such as is known in the art and shown in FIG. 4.

Accordingly, when motorized or self-driven roller 18 is activated, the roller portion of the self-driven roller is directly rotated or driven relative to its shaft portion. Rotation of the roller portion of driven roller 18 drives the drive members 20 positioned along and around the driven roller 18 to independently and separately or individually rotatably drive each of the idler rollers 12 positioned generally above the motorized roller 18. The end rollers 12b of the zone and/or the other rollers 12a (such as positioned above the cross member 24) may also be rotatably driven via one or more O-rings 22 or the like and rotation of the rollers 12 adjacent to the other rollers 12a, 12b. Most or all of the idler rollers 12 of the zone 11a, 11b thus may be independently driven in response to activation of the motor of the motorized or driven roller 18, such that the power or torque output from the motorized roller is substantially the same for each of the independently driven idler rollers 12. The motorized roller 18 may be selectively activated to rotate the roller portion in either direction or to stop rotation of the roller portion, in order to convey articles in either direction along the zone of the conveyor and/or to accumulate articles on the particular zone of the roller conveyor.

Roller conveyor 10 may also include one or more articles or product sensors 30 (such as shown in FIGS. 1, 2 and 5), such as photo sensors or photo eyes or the like, positioned along the roller conveyor, such as at or near a downstream end of each zone 11a, 11b, and operable to detect articles being conveyed along the zone or conveyor. A control 32 may be included to control and activate and deactivate the internal motors of the motorized or driven rollers 18 of the transverse drive units 17 of each zone 11a, 11b in response to the product sensors 30, as discussed below. Products sensors 30 may be any type of sensor, such as a sensor of the types disclosed in U.S. Pat. Nos. 5,582,286 and 6,253,909, and/or U.S. patent application Ser. No. 10/605,277, filed Sep. 19, 2003 by Haan et al., for ACCUMULATING CONVEYOR SYSTEM, which are hereby incorporated herein by reference. In the illustrated embodiment of FIGS. 1, 2 and 5, conveyor 10 comprises two zones 11a, 11b, with each zone having a transverse drive unit 17 with the motorized roller positioned beneath the idler rollers 12 of the zone, and having a product sensor positioned at or toward the end of each zone. However, the number of zones along a conveyor section is a function of the application and may vary without affecting the scope of the present invention.

In the illustrated embodiment, each product sensor 30 comprises a photo sensor positioned at the downstream end of a respective zone and operable to detect products or articles as they move from the downstream end of one zone to an upstream end of the adjacent zone. The motorized or driven roller 18 of the transverse drive system 16 may be selectively activated or deactivated by control 32 in response to a corresponding product sensor 30, or in response to more than one of the products sensors positioned along the roller conveyor, to move or stop an article or articles that are present on the idler rollers of the respective zone. The transverse drive units 17 thus may be directly driven and operable to selectively and independently convey or accumulate one more articles on the associated conveyor zones in response to one or more of the product sensors.

Optionally, the motorized or self-driven rollers and associated transverse drive units may be operable in a "sleep mode", such as described in U.S. Pat. Nos. 5,582,268 and 6,253,909, the disclosures of which are hereby incorporated herein by reference. In such a mode of operation, the control may activate the self-driven or motorized roller of a particular drive unit or zone in response to an article being detected at the beginning of the zone (or at the end of the immediate upstream zone), and may deactivate the motorized roller after the article has moved to the next or downstream zone, such that the motorized roller of the transverse drive unit of a particular zone is only activated when an article is present at the zone and when the article is to be conveyed along the zones of the conveyor. If the downstream zones are not activated, then the motorized roller of the particular zone may be deactivated or stopped to accumulate the detected article or articles on that particular zone of the conveyor. Such a sleep mode operation thus only activates the motorized roller of a zone when an article to be conveyed is present at the particular zone, and thus reduces operation of the motorized rollers to increase the life cycle of the rollers.

Referring now to FIGS. 6-10, a roller conveyor 110 includes a plurality of skewed idler rollers 112 positioned along and between a pair of opposite sidewalls 114a, 114b, and a transverse drive system 116 operable to rotatably drive at least some of the skewed rollers 112. Transverse drive system 116 is substantially similar to transverse drive system 16, described above, such that a detailed discussion of the transverse drive system will not be repeated herein. Suffice it to say that transverse drive system 116 may include two or more transverse drive units 117, each of which includes a motorized or powered or self-driven roller 118 positioned along one of the sidewalls 114a and operable to rotatably drive at least some of the idler rollers 112 via a plurality of drive members or bands 120. Because skewed roller conveyor 110 is substantially similar to roller conveyor 10, discussed above, a detailed description of the skewed roller conveyor 110 and transverse drive system 116 will not be repeated herein. The substantially similar or common components of the roller conveyors are shown in FIGS. 6-10 with similar reference numbers to roller conveyor 10 of FIGS. 1-5, but with 100 added to each of the reference numbers for the components or elements of the skewed roller conveyor 110.

Figure 10:
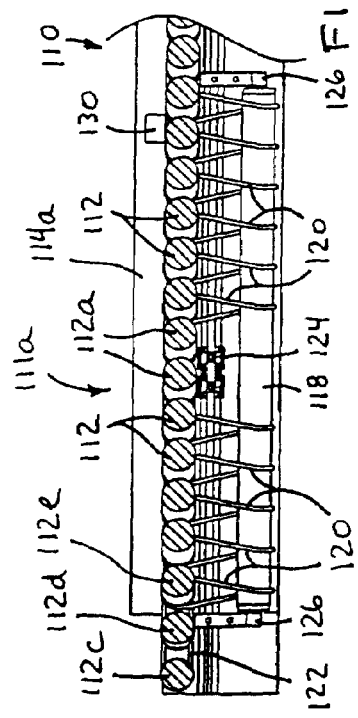
FIG. 10 is a sectional view of the roller conveyor taken along the line X-X in FIG. 8.

As can be seen with reference to FIGS. 6 and 10, the roller conveyor 110 includes skewed idler rollers 112 positioned generally above and along the motorized roller 118 of the respective zone, one or more rollers 112a positioned above a cross member 124 of the roller conveyor, and one or more end rollers 112b positioned at one or both ends of the zones 111a, 111b of the roller conveyor 110. The other idler rollers 112a, 112b may be connected together or rotatably driven via one or more O-rings 122 or the like in a similar manner as discussed above with respect to roller conveyor 10. As best shown in FIG. 6, the end roller 112c of one or both ends of the conveyor section 110 may comprise a non-skewed roller positioned between and generally normal to the sidewalls 114a, 114b of the conveyor section. The roller conveyor section may include one or two partially skewed rollers 112d, 112e positioned between the end roller or rollers 112c and the skewed rollers 112. The partially skewed rollers 112d, 112e provide a transition from the non-skewed end roller 112c and the skewed rollers 112, or from the skewed rollers 112 to the non-skewed end rollers 112c.

Similar to transverse drive system 16, transverse drive system 116 may include two or more transverse drive units 117 for selectively driving or rotating the idler rollers of the respective zone of the roller conveyor. The transverse drive units or system may be selectively operable to convey or stop conveyance of articles along the zones in response to one or more article or product sensors 130, such as in the manner discussed above. The transverse drive units or system thus may convey articles along or accumulate articles on the zones of the roller conveyor.

Optionally, and with reference to FIGS. 11-20, a transverse drive unit 210 may be implemented with a right angle transfer unit 240, which is operable to selectively transfer articles that are being conveyed along the transverse drive unit in a direction generally normal to the direction of conveyance of the transverse drive unit. The transverse drive unit 210 includes one or more motorized rollers 218, which is/are operable to rotatably drive a plurality of rollers 212 via respective drive members 220, such as in a similar manner as described above. The rollers 212 may be spaced apart along the conveyor side-walls, and one or more transfer belts 242 may be positioned between adjacent and spaced apart rollers 212. Transfer unit 240 may selectively vertically move the transfer belts 242 between a lowered position, where the transfer belts are positioned below the conveying surface defined by rollers 212, and a raised position (shown in FIGS. 11-18), where the upper run 242a of transfer belts 242 are above the conveying surface defined by rollers 212, whereby the belts 242 may raise an article upward above the conveying surface and may transfer the article in a direction that is generally normal to the direction of conveyance of the rollers 212 of the conveyor section.

In the illustrated embodiment, the transverse drive system 210 may include two motorized rollers 218, with each motorized roller 218 being mounted or positioned along a respective sidewall 214a, 214b of the conveyor section, such as being mounted at opposite ends to respective brackets 219 (FIGS. 13 and 14). Each motorized roller 218 is operable to drive respective rollers 212 via respective drive members 220, while some of the rollers 212 are spaced apart from the adjacent roller or rollers to allow room for the transverse drive belts 242. Some of the rollers 212a may be drivably connected to one of the rollers 212 via other drive members or O-rings 220a, as can be seen with reference to FIGS. 11 and 12. Transverse drive system 210 may otherwise be substantially similar to the transverse drive systems described above, such that a detailed discussion of the transverse drive systems will not be repeated herein. The similar components of the transverse drive systems are shown in FIGS. 11-18 with similar reference numbers as shown in FIGS. 1-10, but with 100 or 200 added thereto. The transverse drive system may be operable to selectively drive the idler rollers of a conveyor section or zone of a conveyor, such as described above.

Right angle transfer unit 240 includes a plurality of transfer belts 242 reeved around respective sets of wheels or pulleys 244. As best seen in FIGS. 19 and 20, wheels 244 are arranged along and under and supporting an upper run 242a of belt 242 and at least partially along a lower run 242b of belt 242. Belt 242 is reeved around wheels or pulleys 244 and further around one or more motorized or powered or self-driven rollers 246. As can be seen in FIGS. 19 and 20, belts 242 may be reeved around the motorized rollers 246 such that the rollers 246 are not contained within the belt loop, and thus do not have to be fed or looped around a free end of the motorized roller or rollers (in other words, the wheels 244 engage the inner surface of the belts, while the motorized rollers 246 engage the outer surface of the belt). Such an arrangement facilitates enhanced maintenance and repair or replacement of the belts, since they are not reeved around the rollers. The belts thus may be readily removed and/or replaced without having to remove the motorized roller and without having to slide the belts over an end of the motorized roller and along the roller to the desired or appropriate location.

Motorized rollers 246 extend along the conveyor section and generally transverse to the belts 242 and are operable to rotatably drive belts 242 around wheels 244. Motorized roller or rollers 246 include an internal motor operable to rotatably drive a roller portion of the roller relative to an axle portion of the roller, and may comprise any type of motorized roller, such as the types described above with respect to motorized roller 18. In the illustrated embodiment, transfer unit 240 includes a pair of motorized rollers operable in tandem to drive the belts in the desired direction. However, the transfer unit may include only a single motorized or self-driven roller (or may include more than two) depending on the particular application and desired or needed power output or torque of the drive roller or rollers, without affecting the scope of the present invention. Motorized rollers 246 may be operable to drive belts 242 in either direction to move articles in a direction generally transverse to the conveying direction of the transverse drive system when the belts 242 and wheels 244 are in their elevated or raised position. As can be seen with reference to FIGS. 11, 12, 19 and 20, the routing of the belts may be staggered with respect to a wheel 244a, such as a generally centrally positioned wheel at or above the motorized rollers 246, so that the belts cooperate to form a substantially continuous conveying surface when raised above the rollers 212.

Figure 15:
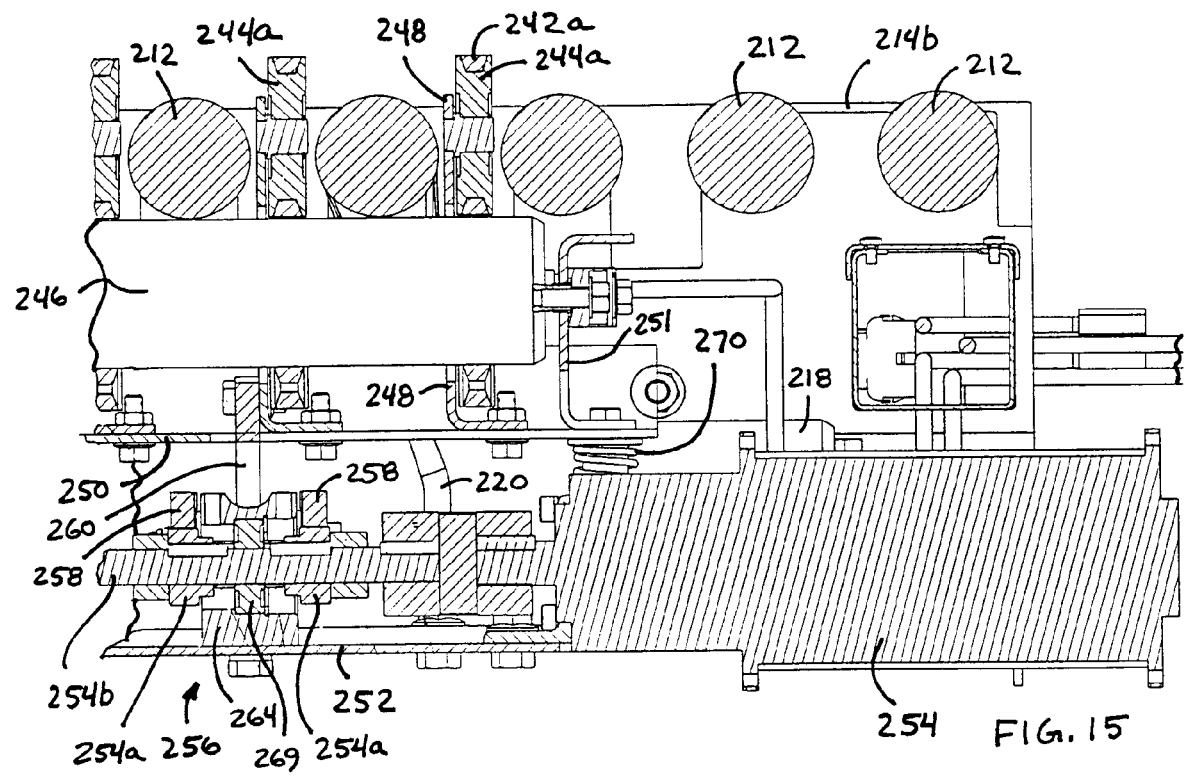
FIG. 15 is a sectional view taken along the line A-A in FIG. 12.

Wheels 244 are rotatably mounted to respective plates 248 that are mounted to a movable plate or platform or movable portion 250 (FIGS. 15-20). Movable plate 250 is vertically movable to raise and lower wheels 244 and belts 242 relative to a mounting base or platform or base portion 252, which may be secured or fixed relative to the conveyor sidewalls 214a, 214b and/or transverse drive unit 210. As best shown in FIG. 15, motorized rollers 246 are mounted to a bracket 251 that is mounted to and extending upward from movable plate 250, such that the motorized rollers also move upward and downward with the wheels and belts relative to the mounting base 252.

Figure 16:
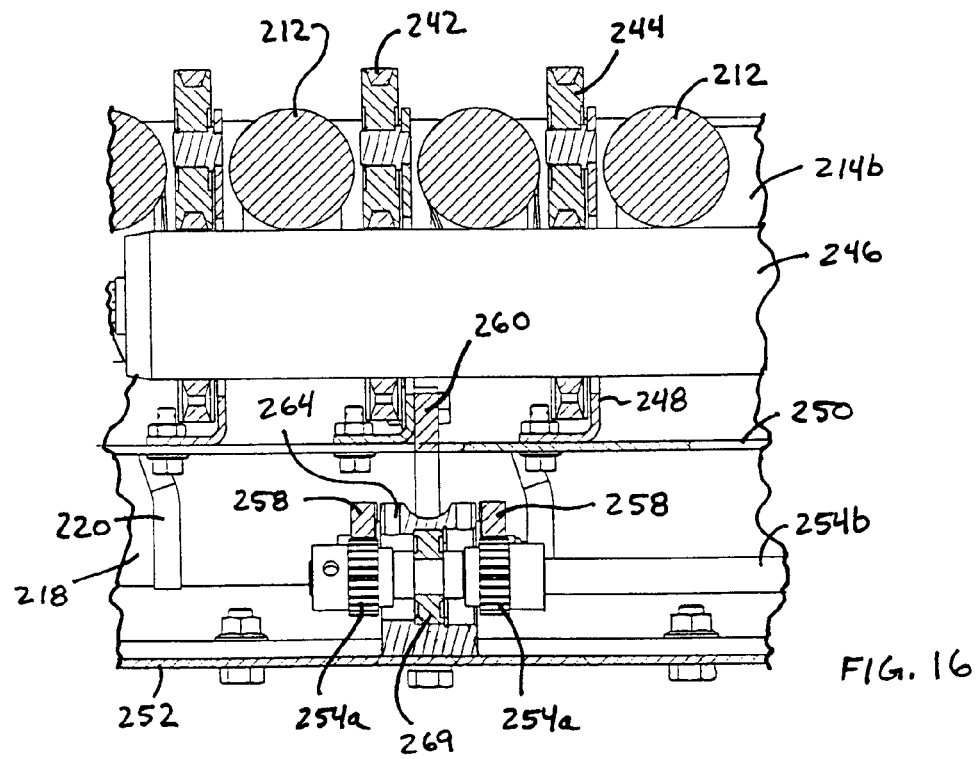
FIG. 16 is a sectional view taken along the line B-B in FIG. 12.
Figure 17:
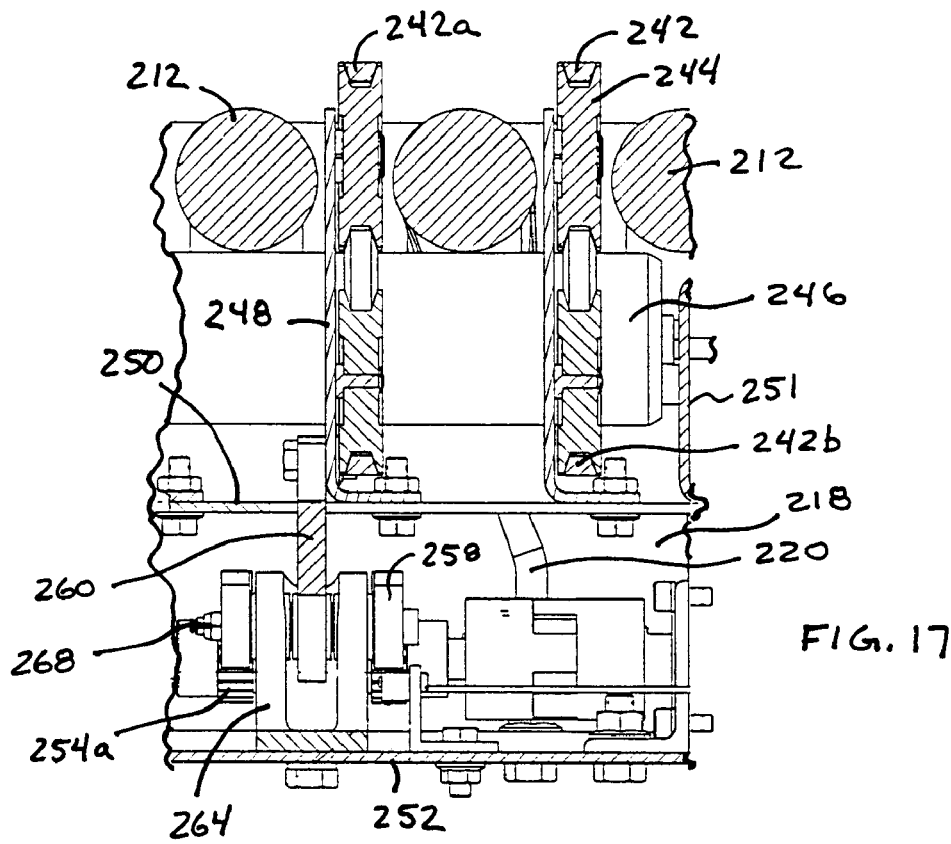
FIG. 17 is a sectional view taken along the line C-C in FIG. 12.

In the illustrated embodiment, movable plate 250 is generally vertically movable via a rotational drive motor 254 and a rack and pinion assembly 256. Drive motor 254 is operable to rotatably drive one or more drive pinions or gears or sprockets 254a, whereby rotation of pinions 254a causes a translational movement of one or more racks or tracks 258 that are engaged with pinions 254a, such as via engagement of respective teeth or projections of the pinions and tracks, as can be seen in FIGS. 13 and 16.

Movable plate 250 is attached to a lift plate 260 that extends downward from movable plate 250. Lift plate 260 includes an angled slot or lifting slot 262 at opposite ends thereof, with the slot being angled or oriented generally upwardly along the lift plate 260 to define angled camming surfaces or lifting/lowering surfaces 262a. Mounting base 252 also includes a guide plate 264 that extends generally upward from mounting base 252. In the illustrated embodiment, mounting base 252 includes a pair of spaced apart guide plates 264, between which lift plate 260 may be positioned. Each guide plate 264 includes a generally horizontal slot 266 at opposite ends thereof. Lift plate 260 is generally adjacent to and between guide plates 264 with slots 262, 266 being positioned such that they are at least partially aligned with one another. As can be seen with reference to FIGS. 12, 15 and 16, transfer unit 240 may include a lift plate 260 and guide plates 264 at or near each end of the transfer unit.

Figure 18:
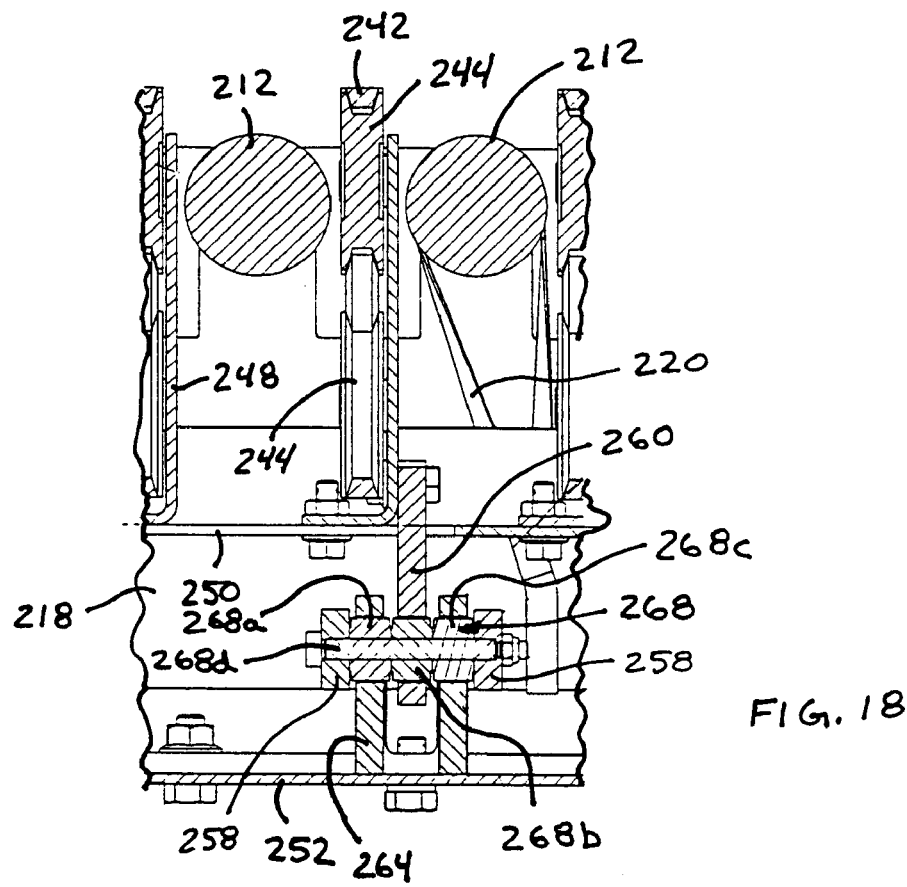
FIG. 18 is a sectional view taken along the line D-D in FIG. 12.

Rack and pinion assembly 256 includes a cam roller or camming member 268 at each end of racks 258. Cam rollers 268 connect the ends of the racks 258 and extend through slots 262, 266 of lift plate 260 and guide plates 264. As can be seen in FIG. 18, the cam roller 268 may include three rollers 268a, 268b, 268c pivotally mounted to a pivot axis or pin 268d, whereby a center roller 268b rolls along slot 262 of lift plate 260 and the opposite end rollers 268a, 268c roll along slots 266 of guide plates 264. Because slot 262 is angled upwardly along lift plate 260, while slots 266 are generally horizontal along guide plates 264, movement of cam roller 268 along the slots 262, 266 causes a generally vertical movement of lift plate 260 relative to guide plates 264. The transfer unit may include cam rollers at the lift plate and guide plates at or near each end of the transfer unit, with the cam rollers connected by an elongated shaft 254b extending from drive motor 254. The shaft 254b may be rotatably supported at guide plates 264 via respective bearings or bushings 269 (FIGS. 15 and 16). Accordingly, when drive motor 254 rotates drive pinions 254a, racks 258 move toward one side or the other, which causes cam rollers 268 to move in that direction. As the cam rollers 268 are moved along slot 266 of guide plate 264, the cam rollers also move along slots 262 of lift plate 260 and, thus, cause raising or lowering of lift plate 260 and movable plate 250 and, thus, of wheels 244 and transfer belts 242.

As shown in FIGS. 13-15, transfer unit 240 may include one or more biasing members or springs 270 mounted between movable plate 250 and mounting base 252 to support the movable plate 250 and to bias the movable plate 250 toward its raised position. The biasing members 270 thus assist in raising the movable plate 250 as the cam rollers 268 are moved along the slots 262, 266, and provide support of the movable plate 250 (and wheels 244 and belts 242 and rollers 246) when articles are raised and transferred by the transfer unit.

Figure 11:
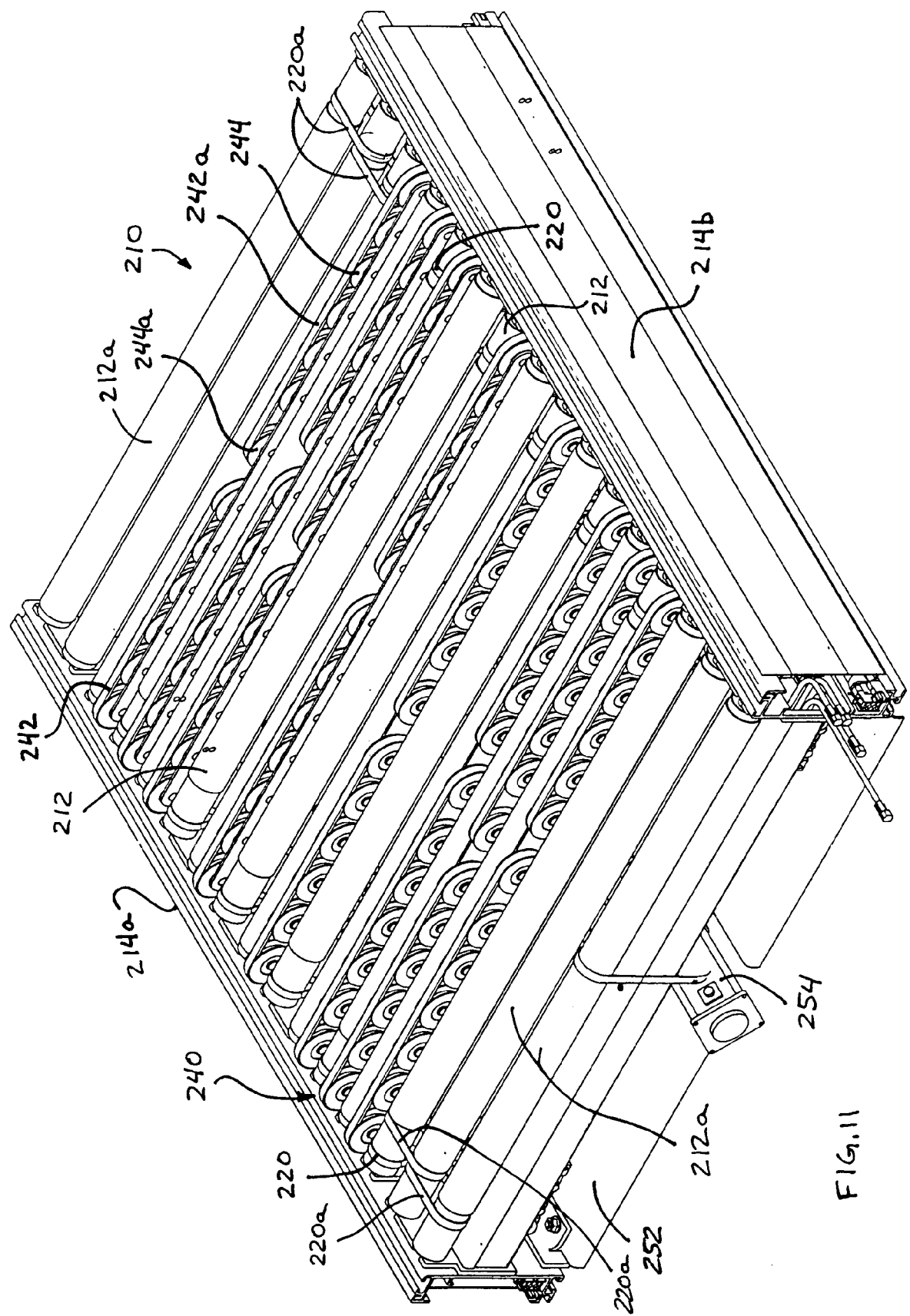
FIG. 11 is a perspective view of a right angle transfer unit in accordance with the present invention.
Figure 12:
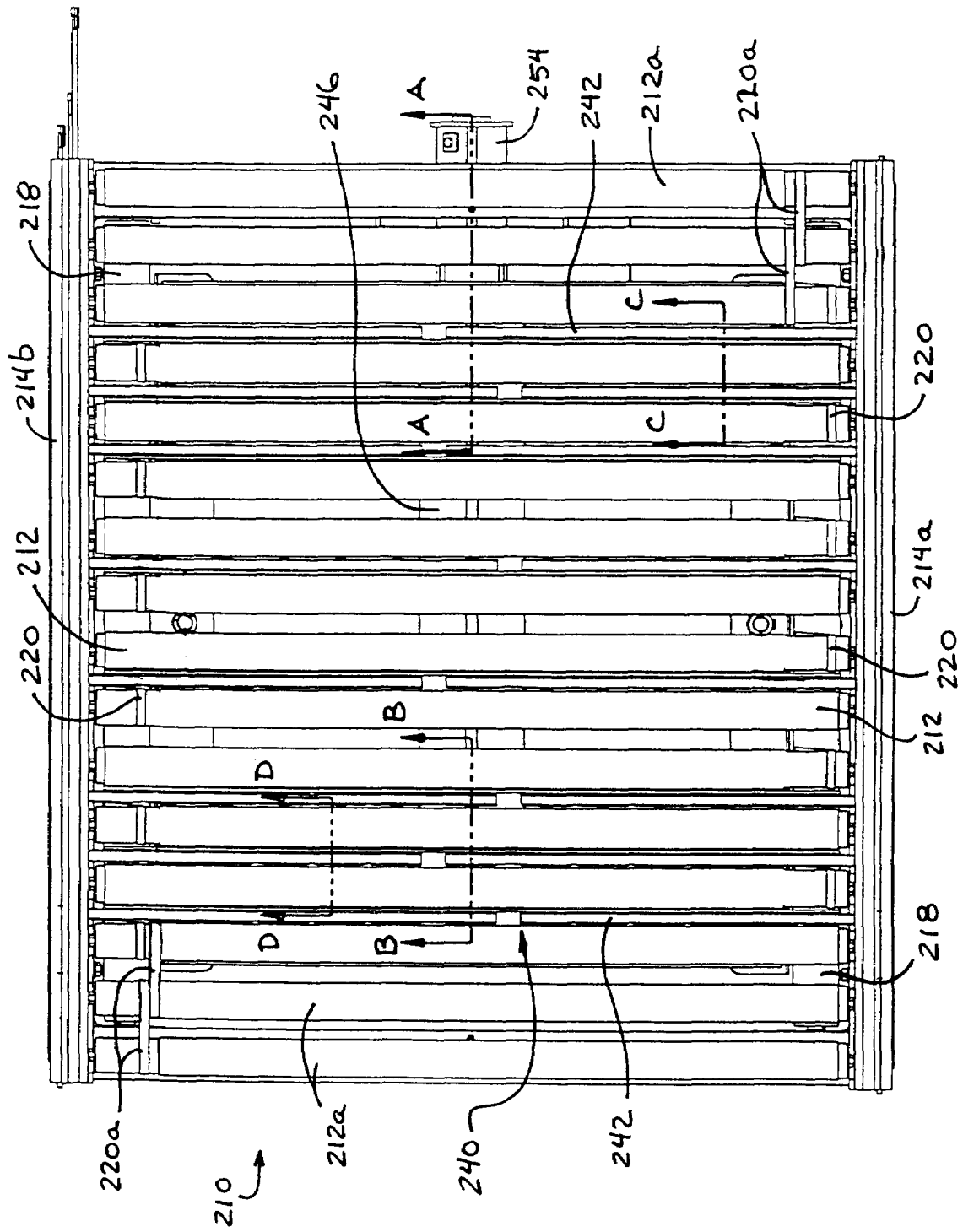
FIG. 12 is a top plan view of the right angle transfer unit of FIG. 11.

The transfer unit, which may be driven via one or more motorized rollers, may be implemented with a motorized roller transverse drive unit or system, such as described above, whereby the transfer unit and transverse drive unit may be positioned along a conveyor section to convey articles along the conveyor section or to transfer or discharge or redirect articles from the conveyor section via the transfer belts. The motorized roller or rollers of the transverse drive unit are positioned along the sidewalls of the conveyor section with the drive members or O-rings 220 extending upwardly between the adjacent wheels 244 and belts 242 and plates 248 of the transfer unit. The plates 248 and wheels 244 are formed and arranged to provide clearance for the motorized rollers 218 of the transverse drive unit when the plates and wheels and belts are lowered relative to the transverse drive unit. As can be seen in FIGS. 11 and 12, one motorized roller may be connected to some of the rollers 212 of the conveyor section, while the other motorized roller of the transverse drive unit may be connected to other rollers of the conveyor section, depending on the particular application. Clearly, however, the rollers of the transverse drive unit may be rotatably driven via a single motorized roller, without affecting the scope of the present invention. Optionally, it is envisioned that the right angle transfer unit of the present invention may be implemented at other types of conveyor sections, such as known or conventional roller conveyor sections or the like.

The transfer belts of the right angle transfer unit thus may be raised or lowered via rotational driving by a rotational motor, without pneumatic or hydraulic lift cylinders and the like, which are typically implemented in conventional or known transfer systems or devices. The right angle transfer unit of the present invention thus may be operable to lift and transfer an article relative to a conveying surface in a quiet and efficient manner.

Therefore, the transverse drive system of the present invention may separately or independently drive many of the rollers of a particular zone or section of a roller conveyor via a motorized or self-driven or powered roller and a plurality of drive members or bands, such that a minimal reduction in torque or power transmission occurs between the motorized roller and the rollers. The present invention thus limits or reduces or substantially precludes the possibility that an article along the roller conveyor may stop or stall at or near the ends of the zones of the roller conveyor. The transverse drive system of the present invention may be equally suitable for rotatably driving skewed rollers or generally normal or transverse rollers of a roller conveyor. The transverse drive system may be implemented with a right angle transfer unit having belts movably positioned between some of the rollers of the conveyor section.

The right angle transfer unit of the present invention is operable to lift an article upward and transfer the article in a direction that is generally normal to the direction of conveyance of the transverse drive conveyor via a rotational drive motor and a rack and pinion assembly, such that lifting cylinders or actuators, such as pneumatic or hydraulic actuators or cylinders are not required. The right angle transfer unit is also operable via one or more motorized rollers, such that the rollers of the conveying section and the belts of the right angle transfer unit may be driven via motorized rollers.

Changes and modifications in the specifically described embodiments may be carried out without departing from the principles of the present invention, which is intended to be limited only by the scope of the appended claims as interpreted according to the principles of patent law.

The embodiments of the present invention in which an exclusive property or privilege is claimed are defined as follows:

1. A roller conveyor comprising:
   a first conveyor section comprising:
   a pair of opposite sidewalls;
   a plurality of idler rollers mounted to said sidewalls and arranged to convey articles along said first conveyor section in a first direction of conveyance;
   a transverse drive system having at least one transverse drive unit comprising:
      a first self-driven roller positioned along one of said sidewalls and generally transverse to said idler rollers, said first self-driven roller comprising an internal motor operable to rotate a roller portion of said first self-driven roller relative to an axle portion of said first self-driven roller; and
      a plurality of drive members, said drive members being engaged with said roller portion of said first self-driven roller, each of said drive members drivably connecting said first self-driven roller and a respective one of said idler rollers, wherein actuation of said first self-driven roller drives said idler rollers via the respective drive members to convey articles in said first direction of conveyance;
   a right angle transfer unit at said first conveyor section, said right angle transfer unit having a plurality of belts that are selectively raisable between at least some of said idler rollers and drivable to convey articles in a direction generally normal to said first direction of conveyance of said idler rollers, said belts being mounted to a movable portion that is vertically movable relative to said sidewalls between a lowered position, where a conveying surface of said belts is positioned below a conveying surface of said idler rollers, and a raised position, where said conveying surface of said belts is positioned above said conveying surface of said idler rollers;
   wherein said movable portion of said right angle transfer unit is vertically movable via a rotational drive member, whereby rotation of said drive member causes translational movement of a camming member, which causes vertical movement of said movable portion relative to a mounting base of said right angle transfer unit, said rotational drive member being rotated via a rotational drive motor, wherein said camming member comprises a roller that rolls along a generally horizontal slot at said mounting base and an angled slot at said movable portion in response to rotation of said drive member; and
   wherein said right angle transfer unit comprises a second self-driven roller having an internal motor operable to rotatably drive a roller portion relative to an axle portion of said second self-driven motor, said second self-driven roller being mounted at said movable portion and arranged generally parallel to said first self-driven roller, said second self-driven roller and said first self-driven roller being independently operable; and a second conveyor section comprising a pair of opposite sidewalls and a plurality of rollers mounted to opposite sidewalls, said second conveyor section being positioned adjacent to said first conveyor section, said plurality of rollers being rotatably driven via a third self-driven roller, said third self-driven roller of said second conveyor section and said first self-driven roller of said first conveyor section being independently operable to convey articles in said first direction of conveyance.

2. The roller conveyor of claim 1, wherein said first self-driven roller is positioned generally beneath said idler rollers.

3. The roller conveyor of claim 2, wherein said first self-driven roller is positioned generally orthogonal to said idler rollers.

4. The roller conveyor of claim 1, wherein said idler rollers are positioned generally orthogonal to said sidewalls.

5. The roller conveyor of claim 1, wherein said idler rollers are skewed with respect to said sidewalls to convey articles partially toward one of said sidewalls.

6. The roller conveyor of claim 5, wherein said first self-driven roller is positioned generally parallel to said sidewalls.

7. The roller conveyor of claim 1, wherein said plurality of drive members comprises at least three drive members and wherein said plurality of idler rollers comprises at least three idler rollers.

8. The roller conveyor of claim 1, wherein said roller conveyor includes a plurality of zones, each of said zones including a transverse drive unit and respective self-driven rollers operable to independently and rotatably drive a plurality of said idler rollers of said respective zone.

9. The roller conveyor of claim 8 including at least one article sensor operable to detect articles on said roller conveyor.

10. The roller conveyor of claim 9, wherein said at least one transverse drive unit is selectively activatable in response to said at least one article sensor to accumulate articles on said idler rollers.

11. The roller conveyor of claim 1, wherein said at least one transverse drive unit is selectively activatable to selectively rotatably drive said idler rollers.

12. The roller conveyor of claim 1, wherein said at least one transverse drive unit is selectively activatable to rotatably drive said idler rollers in either direction.

13. The roller conveyor of claim 1, wherein said rotational drive member comprises a toothed drive pinion that engages corresponding teeth of said camming member.

14. A roller conveyor comprising:

a pair of opposite sidewalls;

at least two tandem zones, each of said at least two tandem zones including a plurality of idler rollers mounted to said sidewalls; and a transverse drive system comprising a transverse drive unit at each of said at least two tandem zones, wherein each of said transverse drive units comprises a motorized roller positioned generally transverse to said plurality of idler rollers and a plurality of drive members connected between said motorized roller and at least some of said plurality of idler rollers, each said motorized roller having an internal motor that is operable to rotate a roller portion of said motorized roller relative to an axle portion of said motorized roller, said motorized rollers being independently operable to drive said drive members to rotatably drive said at least some of said plurality of rollers of the respective ones of said at least two tandem zones;

a right angle transfer unit having a plurality of belts that are selectively raisable and drivable to convey articles in a direction generally normal to the direction of conveyance of said idler rollers; and wherein said belts are mounted to a movable portion that is vertically movable between a lowered position, where a conveying surface of said belts is positioned below a conveying surface of said idler rollers, and a raised position, where said conveying surface of said belts is positioned above said conveying surface of said idler rollers, said movable portion being vertically movable via a rotational drive member, whereby rotation of said drive member causes translational movement of a camming member, which causes vertical movement of said movable portion relative to a mounting base of said right angle transfer unit, wherein said camming member comprises a roller that rolls along a generally horizontal slot at said mounting base and an angled slot at said movable portion in response to rotation of said drive member.

15. A right angle transfer unit positioned at a conveying section, said conveying section comprising:

opposite sidewalls and a plurality of rollers mounted to and between said sidewalls and defining a roller conveying surface for conveying articles in a first direction of conveyance;

a base portion generally fixedly positioned relative to said sidewalls;

a movable portion that is movable generally vertically relative to said base portion;

a plurality of belts, each of which is reeved around a plurality of wheels, said belts and said wheels being mounted to said movable portion and being movably positioned between respective adjacent rollers, said belts defining a belt conveying surface for conveying articles in a second direction of conveyance that is different from said first direction of conveyance;

a rotational drive motor operable to rotate a rotatable drive member, said rotatable drive member being rotatable to cause vertical movement of said movable portion relative to said base portion to raise said belts relative to said rollers such that said belt conveying surface is positioned above said roller conveying surface, said belts being driven to convey articles in said second direction of conveyance when said belts are raised; and wherein said rotatable drive member engaging a lifting member such that rotation of said rotatable drive member causes a translational movement of a lifting member which in turn causes generally vertical movement of said movable portion relative to said base portion, wherein said lifting member moves along a camming surface of said mounting base and a camming surface of said movable portion, said camming surfaces being angled relative to one another such that movement along said camming surfaces causes generally vertical movement of said movable portion relative to said mounting base.

16. The right angle transfer unit of claim 15, wherein said belts are driven via at least one motorized roller having an internal motor operable to rotate a roller portion of said motorized roller relative to an axle portion of said motorized roller.

17. The right angle transfer unit of claim 16, wherein said axle portion of said motorized roller is mounted to said movable portion.

18. The right angle transfer unit of claim 15, wherein said rotational drive motor is operable to selectively generally vertically move said movable portion between a lowered position, where said belt conveying surface is below said roller conveying surface, and a raised position, where said belt conveying surface is above said roller conveying surface.

19. The right angle transfer unit of claim 18 including at least one biasing member that urges said movable portion toward said raised position.

20. The right angle transfer unit of claim 15, wherein said second direction of conveyance is generally normal to said first direction of conveyance.

21. The right angle transfer unit of claim 15, wherein said rotatable drive member comprises a toothed drive pinion that engages corresponding teeth of said lifting member.

* * * * *